United States Patent
Okada et al.

(10) Patent No.: US 6,699,418 B2
(45) Date of Patent: Mar. 2, 2004

(54) METHOD FOR PRODUCING BIAXIALLY STRETCHED FILM MADE OF ETHYLENE-VINYL ALCOHOL COPOLYMER

(75) Inventors: Kazuhisa Okada, Okayama (JP); Nariaki Fujii, Okayama (JP)

(73) Assignee: Kuraray Co., Ltd., Kurashiki (JP)

( * ) Notice: Subject to any disclaimer, the term of this patent is extended or adjusted under 35 U.S.C. 154(b) by 0 days.

(21) Appl. No.: 10/073,988

(22) Filed: Feb. 14, 2002

(65) Prior Publication Data

US 2002/0160217 A1 Oct. 31, 2002

(30) Foreign Application Priority Data

Feb. 23, 2001 (JP) ......................................... 2001-048031

(51) Int. Cl.[7] ........................ B29C 55/12; C08F 216/06
(52) U.S. Cl. ................................. 264/210.7; 264/210.1; 264/235.6; 264/235.8; 264/290.2; 428/220; 428/520; 428/522; 428/910
(58) Field of Search ..................... 264/210.1, 210.7, 264/235.6, 235.8, 290.2; 428/520, 219, 220, 522, 910

(56) References Cited

U.S. PATENT DOCUMENTS

| | | | |
|---|---|---|---|
| 3,440,316 A | 4/1969 | Miyake, et al. | 264/235.6 |
| 4,124,677 A | 11/1978 | Saijo et al. | 264/289 |
| 4,294,935 A | 10/1981 | Kodera et al. | 525/60 |
| 4,731,266 A | 3/1988 | Bonnebat et al. | 428/36.6 |

FOREIGN PATENT DOCUMENTS

| | | |
|---|---|---|
| JP | 53-43198 | 11/1978 |
| JP | 60-26697 | 6/1985 |
| JP | 2600406 | 4/1997 |
| JP | 10-44232 | 2/1998 |

*Primary Examiner*—D. S. Nakarani
(74) *Attorney, Agent, or Firm*—Oblon, Spivak, McClelland, Maier & Neustadt, P.C.

(57) ABSTRACT

A method for producing a biaxially stretched film is provided, in which the method comprises, stretching a film made mainly of an ethylene-vinyl alcohol copolymer having an ethylene content of 15 to 70 mol % and a saponification degree of 80 mol % or more under heating; cooling the film; and subjecting the cooled film to a heat treatment; wherein a heating temperature during the stretching is 60 to 160° C., a cooling temperature is a temperature 30 to 100° C. lower than the heating temperature during the stretching, and a temperature for the heat treatment is 150 to 190° C. The thus obtained biaxially stretched film of the present invention has a small bowing coefficient.

12 Claims, 1 Drawing Sheet

Moving direction of film

10cm

L

METHOD FOR PRODUCING BIAXIALLY STRETCHED FILM MADE OF ETHYLENE-VINYL ALCOHOL COPOLYMER

BACKGROUND OF THE INVENTION

1. Field of the Invention

The present invention relates to a method for producing a biaxially stretched film made of ethylene-vinyl alcohol copolymer (hereinafter, referred to as "EVOH") having a small dry heat shrinkage coefficient, a small bowing coefficient and excellent shape stability. The present invention also relates to a biaxially stretched film obtained by this method and a laminate including this film.

2. Description of the Related Art

EVOH biaxially stretched films are widely used as a material having excellent gas barrier properties. A laminate that is obtained by laminating the EVOH biaxially stretched film and a thermoplastic resin film having excellent moisture resistance and mechanical properties, especially a polyolefin resin film, is used as a multilayered plastic packaging material in various fields. For example, such a laminate is widely used as a container having excellent oxygen barrier properties in the shape of bags, tubes, cups and pouches in various fields such as food, cosmetics, medical and chemical pharmaceuticals, and toiletry. In recent years, food containers, in particular, have come to be more often heated for sterilization before or after filling them with food. Therefore, a material that has not only excellent oxygen barrier properties, but also a small dry heat shrinkage coefficient is in demand.

SUMMARY OF THE INVENTION

The inventors of the present invention have found that when an EVOH biaxially stretched film having a small dry heat shrinkage coefficient is selected, and a polyolefin film as described above is laminated thereon, then the laminate is likely to be curled obliquely (hereinafter, this curl is referred to as "S-shaped curl") with respect to the longitudinal direction (machine direction; MD). The in-depth examination of the inventors of the present invention made it evident that the larger bowing coefficient the EVOH film has, the more likely an S-shaped curl occurs. In the stretched film, considering the conventional knowledge that dry heat shrinkage and bowing are contradictory properties, it seemed difficult to control both properties at the same time.

The inventors of the present invention made in-depth research in view of these facts, and consequently found that when an EVOH having a specific composition is used and specific production conditions are selected, the dry heat shrinkage and the bowing of the EVOH biaxially stretched film can be suppressed at the same time. Thus, the present invention has been achieved.

A method for producing a biaxially stretched film of the present invention comprises: stretching a film made mainly of an ethylene-vinyl alcohol copolymer having an ethylene content of 15 to 70 mol % and a saponification degree of 80 mol % or more under heating; cooling the film; and subjecting the cooled film to a heat treatment; wherein a heating temperature during the stretching is 60 to 160° C., a cooling temperature is a temperature 30 to 100° C. lower than the heating temperature during the stretching, and a temperature for the heat treatment is 150 to 190° C.

In a preferred embodiment, the stretching is simultaneous biaxial stretching.

In a preferred embodiment, preheating is performed at 60 to 160° C. before the stretching.

In a preferred embodiment, a stretching ratio in a longitudinal direction is 2.5 to 4.5, a stretching ratio in a transverse direction is 2.5 to 4.5, and an area stretching ratio is 7 to 15 in the biaxially stretched film.

In a preferred embodiment, a bowing coefficient of the biaxially stretched film is 15% or less.

An ethylene-vinyl alcohol copolymer biaxially stretched film of the present invention is produced by the above-mentioned method, and the film has a dry heat shrinkage coefficient in a longitudinal direction of 4.0% or less.

A laminate of the present invention comprises a layer made of the ethylene-vinyl alcohol copolymer biaxially stretched film and a layer made of another thermoplastic resin.

In a preferred embodiment, the thermoplastic resin is a polyolefin.

Thus, the present invention described herein makes possible the advantages of, providing a method for producing a biaxially stretched EVOH film having a small dry heat shrinkage coefficient, a small bowing coefficient, and excellent properties such as shape stability in a stable manner and in mass quantity; providing a biaxially stretched film obtained by the method having a high utility for packaging; and providing a laminate including a layer made of the biaxially stretched film and a layer made of another thermoplastic resin that is in contact with the above layer, and suitably used as a packaging material.

DESCRIPTION OF THE PREFERRED EMBODIMENT

Figure 1:
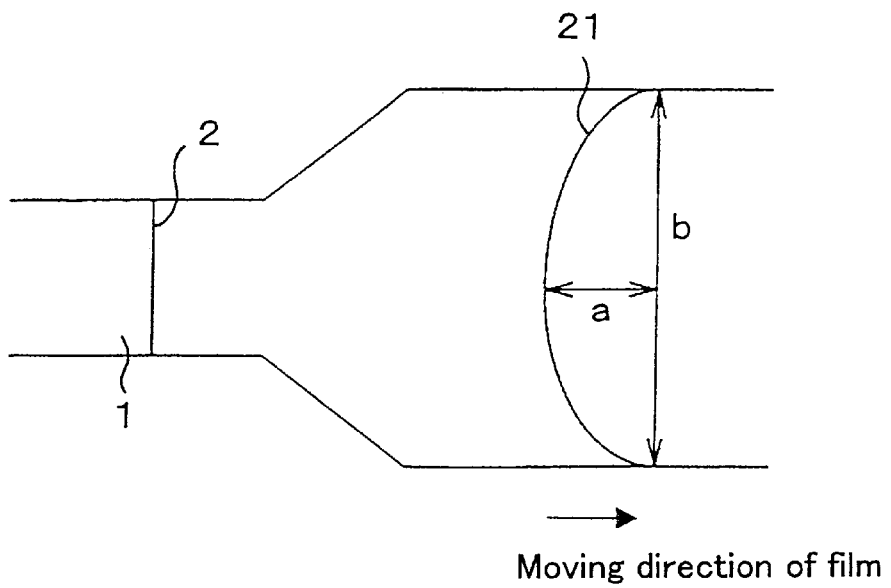
FIG. 1 is a schematic view for illustrating generation of bowing in a process of biaxially stretching an unstretched film.

In the present invention, EVOH, which is a raw material for the biaxially stretched film can be produced by saponifying a copolymer containing ethylene and a vinyl ester as the main components with, for example, an alkaline catalyst. Examples of the vinyl ester include a fatty acid vinyl ester, and a typical example thereof is vinyl acetate. Other than that, vinyl propionate, vinyl pivalate or the like can be exemplified.

The ethylene content of the EVOH should be 15 to 70 mol %, preferably 20 to 50 mol %, and more preferably 25 to 45 mol %. When the ethylene content is less than 15 mol %, the gas barrier properties under high humidity of the obtained film are reduced and the melt-moldability is deteriorated. When it exceeds 70 mol %, sufficient gas barrier properties cannot be obtained.

This EVOH can contain a small amount of another monomer as a copolymer component (a copolymer unit), as long as it does not interfere with the advantages of the present invention. Examples of the monomer that can be copolymerizied include α-olefins such as propylene, 1-butene, isobutene, 4-methyl-1-pentene, 1-hexene, and 1-octene; unsaturated carboxylic acids such as itaconic acid, methacrylic acid, acrylic acid, maleic anhydride, salts thereof, partial or complete esters thereof, nitriles thereof, amides thereof, and anhydrides thereof; vinyl silane compounds such as vinyltrimethoxysilane; unsaturated sulfonic acids or salts thereof; alkylthiols; and vinylpyrrolidones.

The saponification degree of the vinyl ester component of the EVOH should be 80 mol % or more, preferably 90 mol % or more, more preferably 95 mol % or more, and even more preferably 98 mol % or more. When the saponification degree is less than 80 mol %, the gas barrier properties under high humidity of the film including this EVOH are reduced, and also the thermal stability of the EVOH is deteriorated. Therefore, gels or aggregates are likely to be produced in the film.

Two or more kinds of EVOH can be blended for use as the EVOH. In this case, the average value obtained based on the ethylene content or the saponification degree of each EVOH in view of the blend weight ratio is determined as the ethylene content or the saponification degree of the EVOH. Furthermore, when forming the EVOH into a film, a resin (polyamide, polyolefin, etc.) other than the EVOH, additives and the like can be blended as long as it does not practically interfere with the object of the present invention. Examples of the additives include a thermal stabilizer, an ultraviolet absorber, an antioxidant, a coloring agent and a filler. The melting point of the EVOH is preferably in the range from 140 to 220° C.

In order to produce a biaxially stretched film by the present invention, first, an unstretched film is produced by the use of the above-described EVOH alone or by the use of EVOH to which another resin and/or additives are added as necessary. There is no particular limitation regarding the method for producing the unstretched film. For example, the unstretched film can be produced by a process of melt-extruding the EVOH using a screw extruder having a T die for film formation, and then cooling the formed film. The film-forming temperature is preferably in the range from 200 to 280° C. When the film-forming temperature is less than 200° C., the melt-flowability of the EVOH is insufficient, and therefore the formability of the film may be deteriorated. When the film-forming temperature exceeds 280° C., the EVOH may be decomposed by heat and the resultant film may be colored.

The temperature for cooling the unstretched film described above is preferably in the range from 0 to 40° C. If a cooling temperature of less than 0° C. is employed, special equipment is required, which is disadvantageous in the cost. When the cooling temperature that exceeds 40° C. is employed, a long cooling period is required, so that the productivity is reduced.

The thickness of the thus obtained EVOH unstretched film is preferably 100 to 300 µm in view of the handling properties in the stretching process.

The biaxially stretched film of the present invention can be obtained by a process including stretching the unstretched film under heating, cooling the film, and subjecting the film to a heat treatment. The heating temperature for stretching the film is 60 to 160° C. The cooling temperature is a temperature 30 to 100° C. lower than the heating temperature for stretching the film, and the temperature for the heat treatment is 150 to 190° C.

When producing the EVOH biaxially stretched film by the above-described process, it is preferable to allow the unstretched film to contain moisture for production stability. The moisture content of the film is preferably 1 to 30 wt %, more preferably 1 to 20 wt %. When the moisture content of the film is less than 1 wt %, the film is likely to be ruptured in the stretching process. When it exceeds 30 wt %, the mechanical strength of the biaxially stretched film tends to be insufficient.

It is preferable to perform preheating prior to the stretching of the film under heating for production stability. The temperature for the preheating is preferably 60 to 160° C., and more preferably 70 to 140° C. It is preferable to determine the temperature for the preheating by considering the heating temperature for stretching the film. More specifically, the preheating temperature is preferably in the range within ±20° C. of the heating temperature for stretching the film. The preheating period is preferably in the range from 2 to 30 seconds, more preferably in the range from 3 to 10 seconds.

As described above, the heating temperature for stretching the film should be 60 to 160° C., and preferably 70 to 140° C. When the heating temperature for stretching the film is less than 60° C., the bowing coefficient of the obtained biaxially stretched film is large, so that it is highly possible that an S-shaped curl occurs in a laminate including the finally obtained biaxially stretched film. When it exceeds 160° C., the mechanical strength of the biaxially stretched film is insufficient. The period of stretching the film under heating is preferably in the range from 2 to 30 seconds, more preferably in the range from 3 to 10 seconds.

As the biaxial stretching, either simultaneous biaxial stretching or sequential biaxial stretching can be employed. Among them, simultaneous biaxial stretching is preferable with regard to productivity. The stretching ratio is preferably 2.5 to 4.5 in the longitudinal direction (machine direction; MD), and preferably 2.5 to 4.5 in the transverse (width) direction (TD), and the area stretching ratio is preferably 7 to 15. The stretching ratio is more preferably 2.5 to 3.5 in the longitudinal direction, and 2.5 to 3.5 in the transverse direction; and the area stretching ratio is more preferably 8 to 12.

The film that has been stretched biaxially in the above-described manner is then cooled. The cooling temperature should be 30 to 100° C. lower than the heating temperature for stretching the film, and preferably 35 to 75° C. lower than the heating temperature. The cooling temperature is generally 0 to 80° C., and preferably 40 to 75° C. When the difference between the heating temperature and the cooling temperature is less than 30° C., the bowing coefficient of the obtained biaxially stretched film is large, so that it is highly possible that an S-shaped curl occurs in a laminate including the finally obtained biaxially stretched film. When the difference between the heating temperature for stretching the film and the cooling temperature exceeds 100° C., the dry heat shrinkage coefficient of the obtained biaxially stretched film is large. The cooling period is preferably 3 to 10 seconds.

The temperature for the heat treatment after the cooling should be 150 to 190° C., and preferably 155 to 185° C. When the temperature for the heat treatment is less than 150° C., relaxation from the stretching is insufficient, so that the size stability of the obtained biaxially stretched film is deteriorated. When it exceeds 190° C., the bowing coefficient is large, so that it is highly possible that an S-shaped curl occurs in a laminate including the obtained biaxially stretched film (especially, a laminate including a polyolefin layer). The heat treatment period is preferably 2 to 30 seconds, and more preferably 2 to 20 seconds.

The bowing coefficient of the EVOH biaxially stretched film obtained by the above-described method is preferably 15% or less and more preferably 12% or less. When the bowing coefficient exceeds 15%, it is highly possible that an S-shaped curl occurs in a laminate including the obtained biaxially stretched film and the shape stability in its use is deteriorated. In the specification, the "bowing coefficient" is a value defined as follows.

FIG. 1 shows a schematic view showing a process in which a long unstretched film is continuously stretched under heating. A straight line 2 is drawn in an unstretched portion 1 of a film in the width direction of the film. When stretching the film under heating (stretching particularly in the width direction) while moving the film in the longitudinal direction, the central portion in the width direction of the film generally is delayed in the movement, compared with the portions near both the edges of the film. Therefore, the straight line 2 is turned into a bow-shaped curved line 21. The value obtained from the following equation refers to a bowing coefficient BW (%).

BW=(a/b)×100, where a is the maximum delay distance in the curved line 21, and b is the width of the biaxially stretched film.

The dry heat shrinkage coefficient in the longitudinal direction (MD) of the EVOH biaxially stretched film obtained by the above-described method is preferably 4.0% or less, and more preferably 3.5% or less. When the dry heat shrinkage coefficient in the longitudinal direction (MD) exceeds 4.0%, the size stability of the film is deteriorated. Herein, the "dry heat shrinkage coefficient in the longitudinal direction (MD)" refers to a shrinkage coefficient in the longitudinal direction (MD) when an EVOH biaxially stretched film is subjected to dry heat treatment (i.e., the film is heated without supplying additional moisture) at 140° C. for one hour. The thickness of the obtained EVOH biaxially stretched film is generally 5 μm to 30 μm, depending on the application of the film.

It is possible to control both the dry heat shrinkage and the bowing by employing the method of the present invention as described above. In general, the dry heat shrinkage coefficient becomes small by performing the heat treatment sufficiently after stretching, but in this case, the bowing coefficient tends to be large. As a result of the research of the inventors of the present invention, the cooling process at a predetermined temperature is conducted between the stretching process that is conducted at a predetermined temperature and the heat treatment process that is conducted at a predetermined temperature, so that the increase of the bowing coefficient can be suppressed advantageously.

The thus obtained EVOH biaxially stretched film can be used alone or can be used in the form of a laminate including a layer made of the biaxially stretched film and a layer made of another thermoplastic resin. Examples of the thermoplastic resin include polyolefin (e.g., polyethylene, polypropylene, poly(1-butene), poly(4-methyl-1-pentene), an ethylene-propylene copolymer, a copolymer of ethylene and α-olefin having at least 4 carbon atoms, a copolymer of polyolefin and maleic anhydride, an ethylene-vinyl acetate copolymer, an ethylene-acrylate copolymer, and a modified polyolefin obtained by graft modification of any one of these compound with an unsaturated carboxylic acid or with a derivative thereof), nylon (e.g., Nylon 6, Nylon 66, Nylon 6/66 copolymer), polyvinyl chloride, polyvinylidene chloride, polyesters, polystyrene, polyacrylonitrile, polyurethanes, polyacetals, and modified polyvinyl alcohol resins.

There is no particular limitation regarding the structure of the laminate. Examples of the structure include XY, YXY, XYZ, and the like where X is the EVOH biaxially stretched film and Y and Z are other thermoplastic resin layers. There is no particular limitation regarding the laminating method. For example, methods commonly used in this field such as extrusion lamination, dry lamination, and solution coating can be used.

The EVOH biaxially stretched film of the present invention and the laminate including the EVOH biaxially stretched film have excellent gas barrier properties, shape stability, and transparency, so that they can be used mainly as a material for food packaging.

EXAMPLES

Hereinafter, the present invention will be described more specifically by way of examples, but the present invention is not limited thereto. In the examples, the films were evaluated in the following manner.

(1) Dry Heat Shrinkage Coefficient of Film in the Longitudinal Direction

Figure 2A:
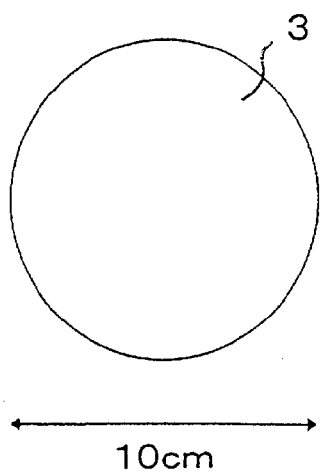
FIGS. 2A and 2B are schematic views showing a change in the size of a circular cut-out film in a dry heat shrinkage test of the stretched film.
Figure 2B:
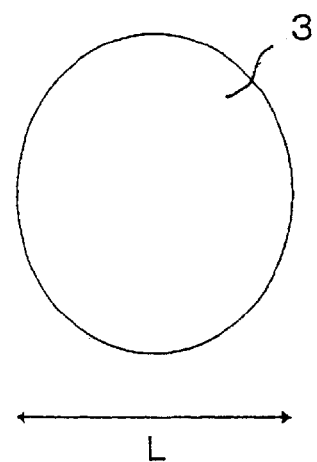

A circular film 3 with a diameter of 10 cm as shown in FIG. 2A is cut out from a central portion in the width direction (TD) of a long biaxially stretched film. This film is subjected to a dry heat treatment at 140° C. for one hour and then cooled to room temperature. The length L (cm) in the longitudinal direction (i.e., MD of the long biaxially stretched film) of the treated film 3 (see FIG. 2B) is read by vernier calipers, and the dry heat shrinkage coefficient S (%) in the longitudinal direction (MD) is obtained with the following equation.

$$S=\{(10-L)/10\} \times 100$$

(2) Bowing Coefficient

As shown in FIG. 1, a straight line 2 is drawn with an oil ink in the width direction of a long unstretched film. The film is heated while being moved in the longitudinal direction for biaxial stretching. In this stretching process, since the central portion of the film is delayed in the moving direction, the stretching is not uniform so that the straight line 2 is turned into a bow-shaped curved line 21. The value obtained from the following equation refers to a bowing coefficient BW (%).

BW=(a/b)×100, where a is the maximum delay distance in the curved line 21, and b is the width of the biaxially stretched film.

Example 1

An EVOH resin having an ethylene content of 32 mol %, a saponification degree of 99.5% and a melting point of 183° C. was melted at 230° C. and extruded from a T die onto a casting roll having a cooled surface of 15° C. At the time of the extrusion, the extruded resin film was blown with air from an air knife at an air flow of 30 m/sec. Thus, an unstretched film having a thickness of 150 μm was obtained. This film was immersed in 50° C. hot water for about 15 seconds. The moisture content after the immersion was 3.0 wt %. Using a simultaneous biaxial stretching machine, the film was preheated at 140° C. for 8 seconds, stretched to three times the size in each of the longitudinal and the transverse directions at 140° C., and then cooled to 70° C. for 7 seconds, followed by a heat treatment at 175° C. for 3 seconds. Thus, an EVOH biaxially stretched film was obtained. Table 1 shows the dry heat shrinkage coefficient and the bowing coefficient of this film. Table 1 also shows the results of Examples 2 to 4 and Comparative Examples 1 to 3, which will be described below.

Examples 2 to 4

EVOH biaxially stretched films were obtained in the same manner as in Example 1 except that the preheating temperature, the stretching temperature, the stretching ratio, the cooling temperature, the heat treatment temperature and the moisture content of the unstretched film were changed to those shown in Table 1.

Comparative Examples 1 to 3

EVOH biaxially stretched films were obtained in the same manner as in Example 1 except that the preheating temperature, the stretching temperature, the stretching ratio, the cooling temperature, the heat treatment temperature and the moisture content of the unstretched film were changed to those shown in Table 1. In Comparative Example 1, the stretching temperature is lower than that of the method of the present invention, and the cooling process is not conducted. In Comparative Example 2, the heat treatment temperature is lower than that of the method of the present invention. In Comparative Example 3, the cooling process is not conducted.

TABLE 1

|  | Moisture content of unstretched film (%) | Stretching ratio MD | Stretching ratio TD | Preheating temp. (° C.) | Stretching temp. (° C.) | Cooling temp. (° C.) | Heat treatment temp. (° C.) | Dry heat shrinkage coefficient (%) | Bowing coefficient (%) |
|---|---|---|---|---|---|---|---|---|---|
| Example 1 | 3.0 | 3.0 | 3.0 | 140 | 140 | 70 | 175 | 3.2 | 9 |
| Example 2 | 5.0 | 3.0 | 3.5 | 110 | 110 | 65 | 172 | 3.4 | 10 |
| Example 3 | 7.0 | 3.0 | 3.0 | 120 | 110 | 70 | 175 | 3.2 | 9 |
| Example 4 | 10.0 | 3.0 | 3.0 | 120 | 110 | 70 | 175 | 3.5 | 10 |
| Comparative Example 1 | 3.0 | 3.0 | 3.0 | 55 | 55 | 70 | 175 | 3.1 | 19 |
| Comparative Example 2 | 5.0 | 3.0 | 3.5 | 110 | 110 | 65 | 140 | 8.2 | 10 |
| Comparative Example 3 | 7.0 | 3.0 | 3.0 | 120 | 110 | 110 | 175 | 6.5 | 19 |

Example 5

A laminate film was obtained by laminating the EVOH biaxially stretched film obtained in Example 1 and a low-density polyethylene film having a thickness of 40 μm by dry lamination, and further laminating a stretched polypropylene film having a thickness of 20 μm such that the polypropylene film was in contact with the EVOH film by dry lamination. This laminate film was cut out to 10 cm×20 cm and folded in two with the low-density polyethylene layer inside so as to make a square. The ends and the two side portions of the two-folded film was heat sealed to produce an airtight bag. This bag was left at room temperature for 5 hours. An S-shaped curl was not visually recognized.

Comparative Example 4

A laminate film was prepared in the same manner as in Example 5, using the biaxially stretched film obtained in Comparative Example 1. A bag was produced in the same manner as in Example 5 using this laminate film, and left, and then an S-shaped curl occurred.

As shown Table 1, the biaxially stretched film obtained by the present invention has a small value both for the bowing coefficient and the dry heat shrinkage coefficient. The laminate produced by the use of such a film has no S-shaped curl. Furthermore, the laminate has a good appearance, and results in a satisfactory bag. On the other hand, the laminate film of Comparative Example 4 has an S-shaped curl, does not have a good appearance, and may result in a poor bag.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A method for producing a biaxially stretched film, comprising:
   stretching a film having a moisture content of 1 to 30 wt %, and comprising mainly an ethylene-vinyl alcohol copolymer having an ethylene content of 15 to 70 mol % and a saponification degree of 80 mol % or more under heating, to obtain a stretched film;
   cooling the stretched film, to obtain a cooled stretched film; and
   subjecting the cooled stretched film to a heat treatment, thereby obtaining said biaxially stretched film;
   wherein a heating temperature during the stretching is 60 to 160° C., a cooling temperature is a temperature 30 to 100° C. lower than the heating temperature during the stretching, and a temperature for the heat treatment is 150 to 190° C.

2. The method of claim 1, wherein the stretching is simultaneous biaxial stretching.

3. The method of claim 2, further comprising preheating before the stretching at a temperature of from 60 to 160° C.

4. The method of claim 1, further comprising preheating before the stretching at a temperature of from 60 to 160° C.

5. The method of claim 1, wherein a stretching ratio in a longitudinal direction is 2.5 to 4.5, a stretching ratio in a transverse direction is 2.5 to 4.5, and an area stretching ratio is 7 to 15 in the biaxially stretched film.

6. The method of claim 1, wherein a bowing coefficient of the biaxially stretched film is 15% or less.

7. The method of claim 1, wherein the cooling of the stretched film is conducted for 3 to 10 seconds.

8. The method of claim 1, wherein a melting point of said ethylene-vinyl alcohol copolymer is from 140 to 220° C.

9. The method of claim 1, wherein a thickness of said film used for said stretching is 100 to 300 μm.

10. An ethylene-vinyl alcohol copolymer biaxially stretched film produced by the method of claim 1, wherein the film has a dry heat shrinkage coefficient in a longitudinal direction of 4.0% or less.

11. A laminate, comprising:
   a layer comprising the ethylene-vinyl alcohol copolymer biaxially stretched film of claim 10 and a layer comprising another thermoplastic resin;
   wherein said laminate is obtained by extrusion lamination, dry lamination or solution coating.

12. The laminate of claim 11, wherein the thermoplastic resin is a polyolefin.

* * * * *